United States Patent
Carofiglio et al.

(10) Patent No.: US 12,261,690 B2
(45) Date of Patent: Mar. 25, 2025

(54) COORDINATED EDGE-ASSISTED RELIABILITY MECHANISM FOR REAL-TIME MEDIA SERVICES

(71) Applicant: Cisco Technology, Inc., San Jose, CA (US)

(72) Inventors: Giovanna Carofiglio, Paris (FR); Michele Papalini, Issy les Moulineaux (FR); Giulio Grassi, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/170,960

(22) Filed: Feb. 17, 2023

(65) Prior Publication Data

US 2024/0283564 A1 Aug. 22, 2024

(51) Int. Cl.
H04L 1/00 (2006.01)
(52) U.S. Cl.
CPC .................................. H04L 1/004 (2013.01)
(58) Field of Classification Search
CPC ......... H04L 1/004; H04L 1/0018; H04L 1/08; H04L 1/0041; H04L 43/0852; H04L 43/0829; H04L 1/1812
USPC .................................................. 714/748–750
See application file for complete search history.

(56) References Cited

U.S. PATENT DOCUMENTS

| | | | |
|---|---|---|---|
| 6,487,690 B1 | 11/2002 | Schuster et al. | |
| 10,659,190 B1 * | 5/2020 | Liu | H04L 1/0018 |
| 11,082,071 B2 * | 8/2021 | Zhang | G06F 11/1048 |
| 2005/0180415 A1 * | 8/2005 | Cheung | H04N 21/6437 348/E7.071 |
| 2005/0229074 A1 | 10/2005 | Chawla et al. | |
| 2009/0282308 A1 * | 11/2009 | Gutsche | G06F 11/1048 714/E11.023 |
| 2010/0097979 A1 * | 4/2010 | Shinozaki | H04L 1/0028 370/315 |
| 2013/0326303 A1 | 12/2013 | Diener et al. | |
| 2015/0223098 A1 * | 8/2015 | Sze | H04L 43/0852 370/235 |
| 2016/0352459 A1 * | 12/2016 | Sato | H04L 69/16 |
| 2018/0139131 A1 * | 5/2018 | Ignatchenko | H04L 47/32 |
| 2019/0037639 A1 * | 1/2019 | Nolan | H04B 7/15528 |
| 2020/0274641 A1 * | 8/2020 | Liu | H04L 41/5025 |
| 2022/0103306 A1 | 3/2022 | Sung et al. | |
| 2023/0171191 A1 * | 6/2023 | Ignatchenko | H04L 45/745 370/392 |

FOREIGN PATENT DOCUMENTS

JP 2000228676 A 8/2008

* cited by examiner

*Primary Examiner* — Albert Decady
*Assistant Examiner* — Osman M Alshack
(74) *Attorney, Agent, or Firm* — Baker Botts L.L.P.

(57) ABSTRACT

A system and method for a coordinated edge-assisted reliability mechanism for real-time media services. In one embodiment, a method includes forwarding, by an edge relay device, data packets between a media server and a client device; measuring packet loss and latency associated with communications between the edge relay device, the media server, and the client device; determining an error correction procedure based at least in part on the measured latency; and implementing the error correction procedure at the edge relay device.

15 Claims, 4 Drawing Sheets

COORDINATED EDGE-ASSISTED RELIABILITY MECHANISM FOR REAL-TIME MEDIA SERVICES

TECHNICAL FIELD

The present disclosure relates generally to a field of media communication systems and, more particularly, to a coordinated edge-assisted reliability mechanism for real-time media services.

BACKGROUND

In real-time media applications (e.g., video calls), a communication system's ability to manage and correct for data packet loss that occurs in the transmission path affects users' ability to understand and enjoy a real-time media stream. Conventional approaches to error correction in real-time media applications involve the use of retransmitting lost data packets or implementing forward error correction data to supplement a data flow. However, conventional approaches to error correction in real-time media applications can lead to uncoordinated, slow-responding, and/or redundant error techniques.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Conventional approaches by communications systems to correct for data packet loss in real-time media applications implement uncoordinated, slow-responding, and redundant techniques, which reduces the quality of real-time media streams. Certain embodiments as described herein improve on these conventional approaches by using an edge relay device that monitors data packet loss occurring in communications between a client device and a media server and coordinates error correction techniques with the client device and media server to increase the reliability of the communications.

According to an embodiment, a method includes forwarding, by an edge relay device, data packets between a media server and a client device; measuring packet loss and latency associated with communications between the edge relay device, the media server, and the client device; determining an error correction procedure based at least in part on the measured latency; and implementing the error correction procedure at the edge relay device. In certain embodiments, implementing the error correction procedure at the edge relay device is based at least in part on a message identifying the client device and data flows associated with the client device.

In some cases, implementing the error correction procedure includes storing, at the edge relay device, data packets sent from the media server, and transmitting one or more of the stored data packets to the client device upon receiving a retransmission request from the client device. In such cases, determining the error correction procedure based at least in part on the measured latency includes determining the error correction procedure based at least in part on measuring lower latency between the client device and the edge relay device than between the edge relay device and the media server.

In certain embodiments, implementing the error correction procedure further includes generating, by the edge relay device, forward error correction (FEC) data, and adding the FEC data to data packets received at the edge relay device. In some cases, the FEC data is generated based at least in part on an FEC algorithm communicated by the media server.

In some embodiments, determining the error correction procedure based at least in part on the measured packet loss and latency includes determining the error correction procedure based at least in part on measuring lower latency between the media server and the edge relay device than between the client device and the edge relay device.

According to other embodiments, a system includes one or more processors and one or more computer-readable non-transitory storage media. The one or more computer-readable non-transitory storage media include instructions that, when executed by the one or more processors, cause the system to perform operations including forwarding, by an edge relay device, data packets between a media server and a client device; measuring latency associated with communications between the edge relay device, the media server, and the client device; determining an error correction procedure based at least in part on the measured latency; and implementing the error correction procedure at the edge relay device.

According to yet another embodiment, one or more computer-readable non-transitory storage media embody instructions that, when executed by the processor, cause the processor to perform operations including forwarding, by an edge relay device, data packets between a media server and a client device; measuring latency associated with communications between the edge relay device, the media server, and the client device; determining an error correction procedure based at least in part on the measured latency; and implementing the error correction procedure at the edge relay device.

Technical advantages of certain embodiments of this disclosure may include one or more of the following. A technical advantage of one embodiment may allow for improved reliability in real-time communications between a client device and a media server. Another technical advantage of one embodiment may allow for the deployment of a lightweight edge relay device that can implement forward error correction techniques instead of a resource-heavy local media server. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
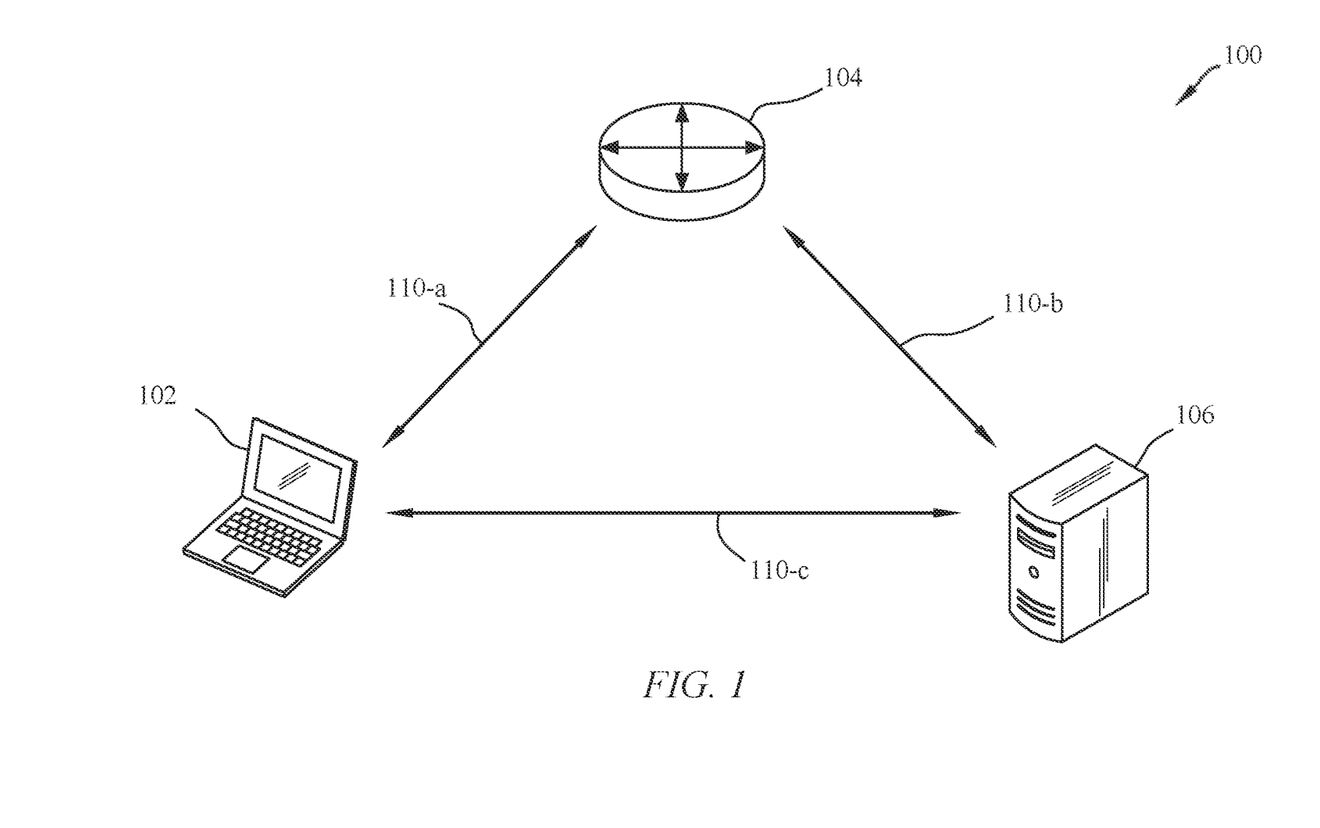
FIG. 1 illustrates an example network for a coordinated edge-assisted reliability mechanism for real-time media services, according to some embodiments of the present disclosure.
Figure 2:
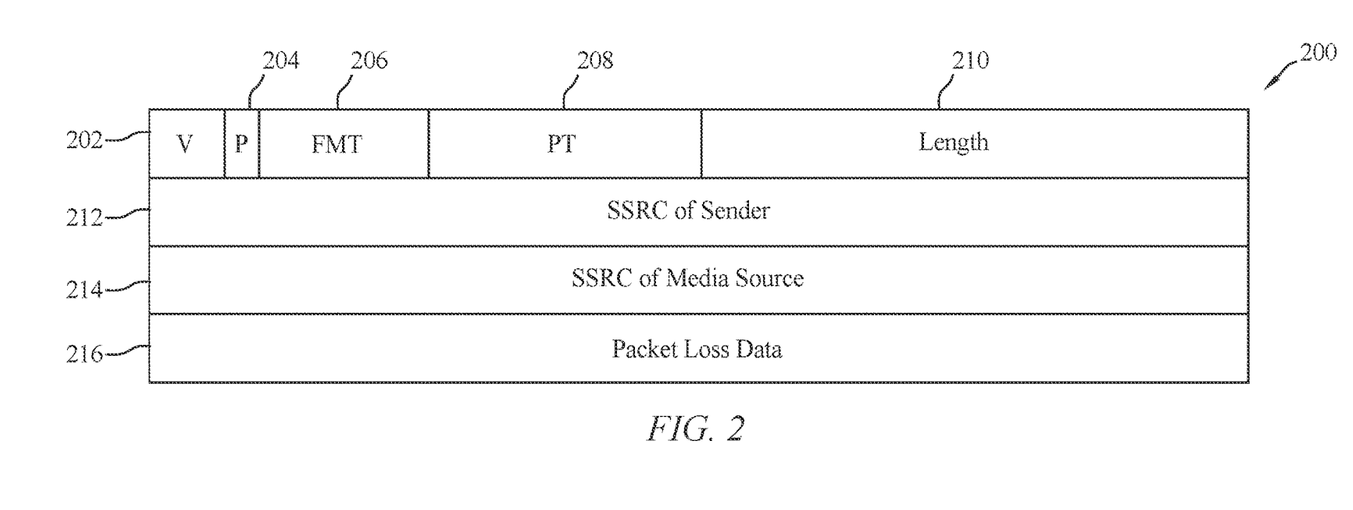
FIG. 2 illustrates an example feedback message for a coordinated edge-assisted reliability mechanism for real-time media services, according to some embodiments of the present disclosure.
Figure 3:
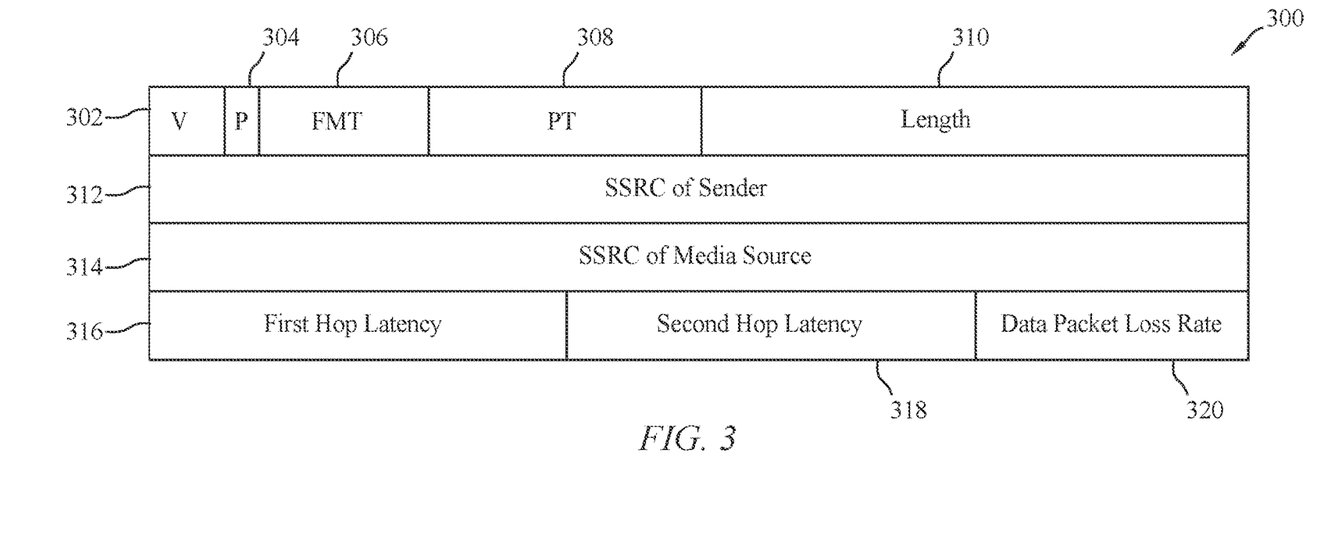
FIG. 3 illustrates an example feedback message for a coordinated edge-assisted reliability mechanism for real-time media services, according to some embodiments of the present disclosure.
Figure 4:
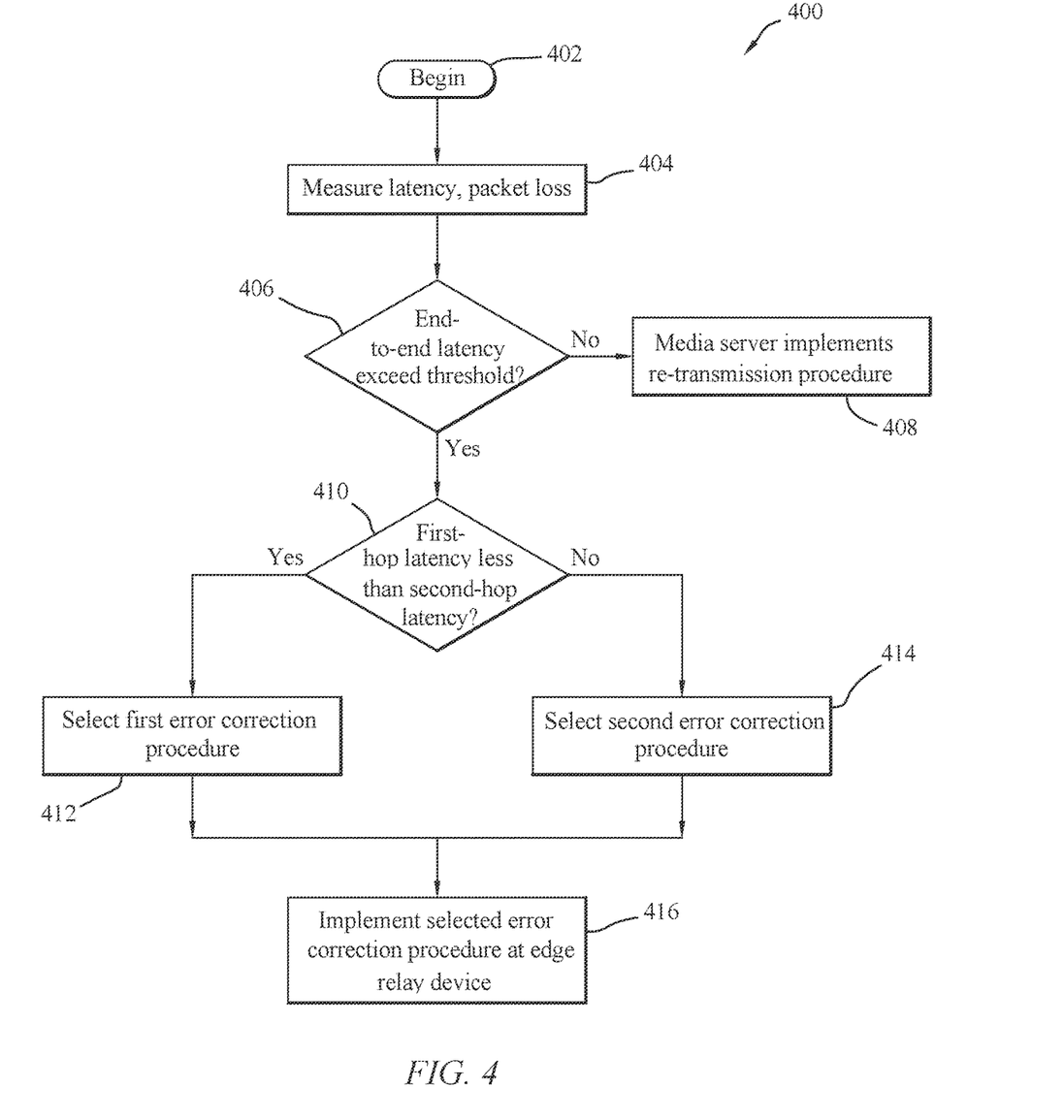
FIG. 4 illustrates an example method for a coordinated edge-assisted reliability mechanism for real-time media services, according to some embodiments of the present disclosure.
Figure 5:
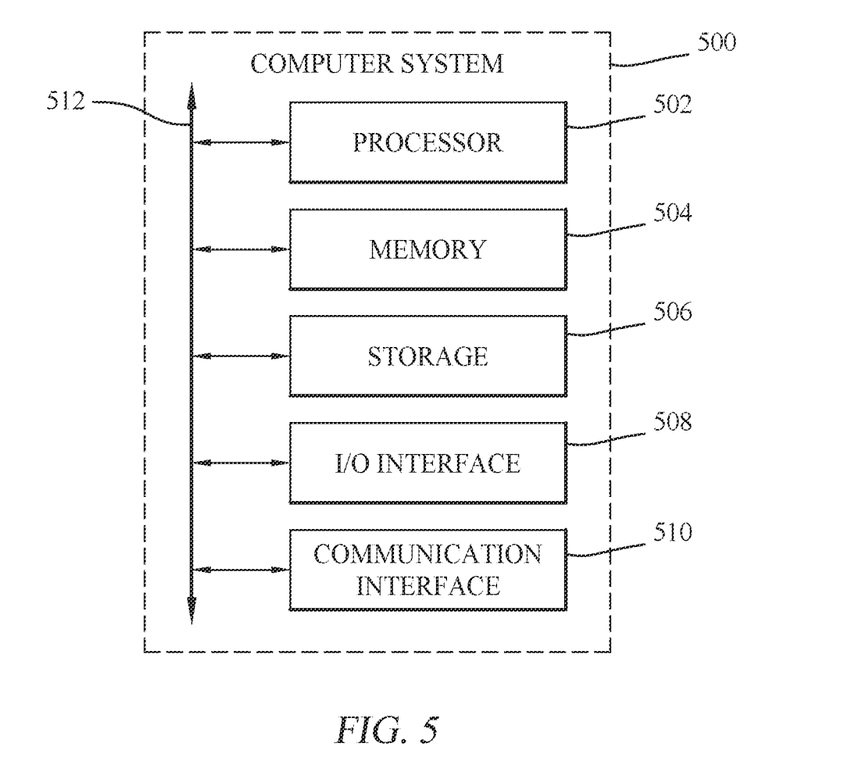
FIG. 5 illustrates an example of a computer system, according to some embodiments of the present disclosure.

This disclosure describes systems and methods for a coordinated edge-assisted reliability mechanism for real-time media services. FIG. 1 illustrates an example network for a coordinated edge-assisted reliability mechanism for real-time media services, in accordance with certain embodiments. FIG. 2 illustrates an example feedback message for a coordinated edge-assisted reliability mechanism for real-time media services, in accordance with certain embodiments. FIG. 3 illustrates an example feedback message for a coordinated edge-assisted reliability mechanism for real-time media services, in accordance with certain embodiments. FIG. 4 illustrates an example method for a coordinated edge-assisted reliability mechanism for real-time media services, in accordance with certain embodiments. FIG. 5 illustrates an example of a computer system, in accordance with certain embodiments.

In real-time media communications systems, such as video call applications, client devices communicate with a media server by sending and/or receiving data packets associated with a real-time media stream. During transmission, data packets may be lost or corrupted, which reduces the quality of the real-time media stream through, for example, choppy content delivery. In existing methods and systems to correct for data packet loss, conventional techniques may involve the retransmission of lost or corrupted data packets. In some cases, a network device sending real-time data may generate forward error correction (FEC) data, which may be added to a real-time data stream and processed at the destination device to correct for packet errors. Sometimes, an in-path device (e.g., an edge relay device) is used as a middle-man device to limit losses that occur due to a lengthy communication path. In conventional approaches, the in-path device is limited to monitoring network conditions, so devices at the end points of the communication path (i.e., the media server and the client device) are responsible for implementing any error correction techniques. In some cases, a communications system may deploy a local, full-scale media server closer to client devices to limit packet losses due to transmission path length, but a full-scale media server is resource-greedy and difficult to implement at a network edge where client devices are located. Further, the implementation of several media servers in a network can complicate error correction efforts and introduce redundancy in the network.

Certain embodiments as described herein improve on these conventional approaches by utilizing an edge relay device that not only monitors network conditions (e.g., by measuring data packet losses) but also actively participates in error correction techniques to increase the reliability of real-time media streams between a client device and a media server. In some cases, the edge relay device acts as a cache that stores data packets, and retransmits those data packets to a client device upon the client device's request. In some cases, the edge relay device is configured to generate and/or decode FEC data such that it can encode or decode real-time media data itself before transmitting real-time media data to a destination device. The edge relay device's ability to implement these error correction techniques may increase reliability in a real-time communications system, as the edge relay device may be deployed close to the client device such that it can more quickly respond to data packet loss. Further, the type of error correction technique implemented by the edge relay device may be dependent on network conditions and characteristics (e.g., latency between network devices and measured data packet loss) and coordinated with other network devices to avoid redundant error correction efforts. And the edge relay device can implement the error correction techniques on a per-device basis and/or a per-data stream (also referred to as a data flow) basis, thus avoiding the need to deploy a full-scale, resource-greedy media server to service local client devices.

FIG. 1 is an illustration of an example network for a coordinated edge-assisted reliability mechanism for real-time media services, according to particular embodiments. The components of network 100 may include any suitable combination of hardware, firmware, and software. For example, the components of network 100 may use one or more elements of the computer system of FIG. 5. In the illustrated embodiment, network 100 includes client device 102, edge relay device 104, and media server 106. Client device 102, edge relay device 104, and media server 106 may communicate via communication links 110. Communication links 110 represent any suitable hardware and/or software that facilitates communication between the components of system 100. Communication links 110 may be wired or wireless. Communication links 110 may use any networking protocol suitable to carry data packets within network 100, including Internet Protocol (IP), general packet radio service (GPRS) tunneling protocol (GTP), next generation application protocol (NGAP), User Datagram Protocol (UDP), real-time transport protocol (RTP), and transmission control protocol (TCP). Communication links 110 may include leased lines, Multiprotocol Label Switching (MPLS), IP Security (IPsec), virtual private network (VPN) tunnels, fiber, T1 connections (e.g., bonded T1 connections), Digital Subscriber Line (DSL) (e.g., asymmetrical DSL, symmetrical DSL, high data rate DSL, very high data rate DSL, etc.), cable modems, dedicated internet access (DIA) circuits, ethernet circuits, Local Area Network (LAN) circuits, and the like. For example, client device 102 and edge relay device 104 may communicate via communication link 110-$a$, edge relay device 104 and media server 106 may communicate via communication link 110-$b$, and client device 102 and media server 106 may communicate via communication link 110-$c$.

Client device 102 may include end-user devices such as laptops, phones, tablets, and any other suitable device that is capable of receiving, creating, processing, storing, and/or communicating information, including information related to real-time media. Client device 102 may comprise one or more network interfaces, at least one processor, and a memory that is interconnected by a system bus as well as a power supply. In some embodiments, client device 102 represents devices that are capable of communicating real-time media information and include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. Client device 102 may also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

Edge relay device 104 represents any suitable device that is capable of facilitating communication between one or more client devices 102 and one or more media servers 106 in a computer network. Edge relay device 104 may include edge routers, access routers, branch routers, or the like. Edge relay device 104 may be interconnected to endpoints in a network by the public internet, a multiprotocol public switching (MPLS) VPN, a Software Defined Wide Area Network (SD-WAN), an SD-WAN overlay, a WAN, a local-area network (LAN), or the like.

Media server 106 represents any suitable device that is capable of delivering audio and/or video content as the content is generated in real-time (or with a slight delay). Media server 106 may include the processing, memory, local storage, and network connectivity that drive real-time media communication systems. Media server 106 may be a virtualized server.

Edge relay device 104 may forward data packets between client device 102 and media server 106. The data packets may be associated with a real-time media stream, such as a video call. Client device 102 may measure the transmission delay (i.e., latency) for communications between client device 102 and edge relay device 104 (i.e., the "first hop"), and client device 102 may measure the latency for communications between edge relay device 104 and media server 106 (i.e., the "second hop"). Client device 102 may measure latency in milliseconds (ms), for example.

In some cases, client device 102 may measure the latency on the first hop by utilizing a ping network utility, which allows client device 102 to measure the round-trip time of a message sent from client device 102 to edge relay device 104 and echoed back to client device 102. In other cases, client device 102 may measure the latency on the first hop by measuring the round-trip time of a communication from client device 102 to edge relay device 104 and a corresponding retransmission request sent from edge relay device 104 to client device 102.

Client device 102 may also measure the latency on the second hop. For example, client device 102 may determine the end-to-end round-trip time of a communication between client device 102 and media server 106 and a corresponding message from media server 106 to client device 102. Client device 102 may determine the latency on the second hop as the difference of this measured end-to-end round-trip time and the measured latency on the first hop.

Client device 102 may report the measured first-hop latency and second-hop latency to media server 106 by inserting the latency measurements in a first feedback message (e.g., feedback message 300 as described below in more detail with reference to FIG. 3).

Edge relay device 104 may measure packet loss that occurs for data flows (i.e., series of data packets) transmitted on the second hop (i.e., between edge relay device 104 and media server 106). For example, media server 106 may transmit a first data flow to edge relay device 104 for forwarding to client device 102. The first data flow may be associated with a real-time media source, such as a sporting event or a user in a video call. Accordingly, media server 106 may assign the first data flow with a synchronization source (SSRC) identifier, which may associate the first data flow with the real-time media source for identification purposes. The data packets comprising the first data flow may be assigned sequence numbers in accordance with the order in which they are transmitted (i.e., the first data packet transmitted may have a sequence number of 0, the second data packet transmitted may have a sequence number of 1, and so on). When receiving the first data flow, edge relay device 104 may check on the sequence numbers of the received data packets to determine whether any data packets were lost on the second hop. For example, if edge relay device 104 receives data packets with sequence numbers 0, 1, 3, 4, and 6, edge relay device 104 may determine that the data packets associated with sequence numbers 2 and 5 were lost. Edge relay device 104 may periodically (e.g., once every 5 second, minute, or other interval of time) report the packet loss measured on the second hop to client device 102. For example, when reporting the packet losses for the first data flow, edge relay device 104 may insert the SSRC identifier associated with the first data flow, along with the number of lost packets associated with the first data flow, in a second feedback message (e.g., feedback message 200 as described below in more detail with reference to FIG. 2). Edge relay device 104 may then transmit the second feedback message to client device 102.

Client device 102 may measure packet loss that occurs for data flows transmitted on the first hop (i.e., between edge relay device 104 and client device 102). For example, media server 104 may forward the data packets associated with the first data flow to client device 102, which may determine whether any additional packets are lost on the first hop. For example, in forwarding the first data flow to client device 102, edge relay device 104 may forward data packets 0, 1, 3, 4, and 6 to client device 102. Client device may receive data packets 0, 3, 4, and 6, and accordingly determine that the data packet associated with sequence number 1 was lost on the first hop. Client device 102 may then determine a data packet loss rate that indicates, for example, the percentage of the total lost data packets associated with a given data flow that were lost on the first hop. For example, when determining the data packet loss rate associated with the first data flow, client device 102 may determine that one data packet was lost on the first hop (i.e., based on the data packets received by client device 102 from edge relay device 104) and that two data packets were lost on the second hop (i.e., based on the second feedback message transmitted by edge relay device 104 to client device 102). Accordingly, client device 102 may determine that one of the three lost data packets associated with the first data flow were lost on the first hop, so client device 102 may generate a data packet loss rate value of 0.33 (i.e., (1 data packet lost of the first hop)/(three data packets lost in total)). Client 102 may report the data packet loss rate to media server 106 by inserting the data packet loss rate value in the first feedback message (e.g., feedback message 300 as described below in more detail with reference to FIG. 3).

Upon receiving the first feedback message from client device 102, media server 106 may determine an error correction procedure to help correct the data packet losses occurring in the transmissions between client device 102, edge relay device 104, and media server 106. Media server 106 may determine the error correction procedure based on the first hop latency, second hop latency, and/or data packet loss rate values included in the first feedback message sent by client device 102.

When the end-to-end latency (i.e., the sum of the first hop latency and the second hop latency) is less than a latency threshold (e.g., 50 ms or 100 ms), media server 106 may determine to implement a retransmission procedure to recover lost data packets. In following the retransmission procedure, client device 102 may send a retransmission request to media server 106 (e.g., through edge relay device 104 or directly to media server 106), which will retransmit the data packet indicated by the retransmission request. In some cases, a network manager (e.g., a manager of network 100) may determine the latency threshold value and program media server 106 with that value; in other cases, the latency threshold value may be dynamically determined by the media server 106 (i.e., according to an algorithm that may be based on, for example, network conditions). When implementing the retransmission procedure, media server 106 may determine to stop generating and sending forward error correction (FEC) data, which may save resources in network 100.

In some cases, the end-to-end latency may be greater than the latency threshold. In such cases, media server 106 may determine to use edge relay device 104 in a first error correction procedure. For example, when the end-to-end latency is greater than the latency threshold, and the first hop latency is less than the second hop latency, media server 106 may determine that it is efficient to use edge relay device 104, instead of media server 106, to fulfill retransmission requests from client device 102. In such a case, edge relay device 104 may act as a data packet cache and store data packets received from media server 106. Edge relay device 104 may then retransmit any data packets that client device 102 requests using a retransmission request. Media server 106 may transmit one or more messages to edge relay device 104 that identify the data flow (or data flows) whose corresponding data packets should be stored by edge relay device 104 as well as the client device 102 to which the data flow(s), as well as any requested data packets, should be transmitted. Media server 106 may identify the client device 102 with a contributing source (CSRC) identifier and the data flow(s) with an SSRC identifier. The one or more messages transmitted by media server 106 may be Session Description Protocol (SDP) messages, or parts of SDP messages. In some cases, the one or more messages transmitted by media server 106 may be standard receiver report or sender report messages.

To request edge relay device 104 to retransmit a data packet that was not received or received with error, client device 102 may transmit a not-acknowledged, or negative acknowledgement, (i.e., NACK) message to edge relay device 104. The NACK message may operate as a retransmission request, and client device 102 may identify the requested data packet in the NACK message using, for example, a sequence number associated with the requested data packet. Upon receiving the NACK message from client device 102, edge relay device 104 may check if it has received a message from media server 106 instructing edge relay device 104 to fulfill the retransmission request (i.e., the NACK message). If edge relay device 104 has not received such an instruction, edge relay device 104 may forward the NACK message to media server 106, which may then fulfill the retransmission request by resending the requested data packet. If edge relay device 104 has received such an instruction, edge relay device 104 may resend the requested data packet to client device 102.

Based on edge relay device 104's handling of the retransmission requests, media server 106 may determine to cease certain error correction procedures at media server 106. For example, media server 106 may generate forward error correction (FEC) data packets and transmit these packets along with a data flow to mitigate packet loss. Upon instructing edge relay device 104 to handle retransmission requests from client device 102, media server 106 may determine that the impact of data packet loss of the first hop has been sufficiently mitigated such that media server 106 may determine to cease generating and sending FEC data packets. This determination may be based on a feedback message from client device 102 that indicates that data packet loss rates are decreasing.

In some cases, the end-to-end latency may be greater than the latency threshold, and the first hop latency may be greater than the second hop latency. In such cases, media server 106 may determine to use edge relay device 104 in a second error correction procedure. When operating according to the second error correction procedure, edge relay device 104 may operate in accordance with the first error correction procedure (i.e., as a data packet cache that handles retransmission requests), and edge relay device 104 may also implement FEC procedures. That is, edge relay device 104 may generate, transmit, and decode FEC data when operating in accordance with the second error correction procedure.

To configure edge relay device 104 to implement the second error correction procedure, media server 106 may transmit one or more messages to edge relay device 104 that identify the client device 102, as well the data flow (or data flows) associated with client device 102 whose corresponding data packets should be handled by edge relay device 104 in accordance with the second error correction procedure. Media server 106 may identify the client device 102 with a CSRC identifier and identify the associated data flow(s) with an SSRC identifier(s). Media server 106 may also include one or more FEC algorithms, as well as parameters associated with the one or more FEC algorithms, in the one or more messages sent to edge relay device 104. Edge relay device 104 may use the one or more FEC algorithms, and associated parameters, to generate and/or decode FEC data that is later sent to or received from client device 102. The one or more messages transmitted by media server 106 may be Session Description Protocol (SDP) messages, or parts of SDP messages. In some cases, the one or more messages transmitted by media server 106 may be standard receiver report or sender report messages.

Media server 106 may select the one or more FEC algorithms based on the capabilities of one or more applications used by client device 102. For example, client device 102 may use a first application to send and receive real-time media to and from media server 106. Media server 106 may determine that the first application is able to implement a first or a second FEC algorithm but not a third FEC algorithm. Accordingly, media server 106 may select the first or the second FEC algorithm and send the first or second FEC algorithm, or other information indicating the first or second FEC algorithm, to edge relay device 104, thereby instructing edge relay device 104 to use the first or second FEC algorithm to generate or decode FEC data. And media server 106 may associate the selected one or more FEC algorithms with the data flow of an application used by client device 102, such that edge relay device 104 knows the data flow to which a given FEC algorithm should be applied.

For example, client device 102 may exchange real-time media with media server 106 using two applications. The first application may be a real-time video call application, whereby client device 102 generates real-time media and sends it to media server 106 and receives real-time media from media server 106. The second application may be a real-time video streaming application, whereby client device 102 receives real-time media from media server 106. Media server 106 may determine that the first application can implement a first FEC algorithm and that the second application can implement a second FEC algorithm. When media server 106 determines that edge relay device 104 should be configured according to the second error correction procedure, media server 106 may transmit one or more messages to configure edge relay device 104. For example, media server 106 may transmit a first message that includes a CSRC identifier that identifies client device 102, a first SSRC identifier that identifies data flows associated with the first application, and the first FEC algorithm (and associated parameters for implementing the first FEC algorithm). Media server 106 may also transmit a second message that includes a CSRC identifier that identifies client device 102, a second SSRC identifier that identifies data flows associated with the second application, and the second FEC algorithm (and associated parameters for implementing the second FEC algorithm). Edge relay device 104 may store the information included in the first and second messages and cross-reference this information when edge relay device 104 receives data packets to determine whether to implement the indicated FEC algorithms.

Based on the received first and second messages, edge relay device 104 may be configured for generating and/or decoding FEC data that edge relay device sends to and/or receives from client device 102. For example, edge relay device 104 may receive, from media server 106, a first data packet associated with the first data flow (e.g., as indicated by an SSRC identifier included in the first data packet) that is to be forwarded to client device 102. Edge relay device 104 may cross reference the SSRC identifier included in the first data packet and determine that the first FEC algorithm is to be applied to the first data packet. Accordingly, edge relay device 104 may generate FEC data according to the first FEC algorithm (and parameters associated with the first FEC algorithm), and transmit the generated FEC data to client device 102 along with the first data packet. And edge relay device 104 may receive, from client device 102, a second data packet associated with the first data flow (e.g., as indicated by an SSRC identifier included in the second data packet) that is to be forwarded to media server 106. In some cases, the second data packet may be an FEC data packet that is encoded according to the first FEC algorithm. Edge relay device 104 may cross reference the SSRC identifier included in the second data packet and determine that the first FEC algorithm is to be applied to the second data packet. Accordingly, edge relay device 104 may decode the second data packet according to the first FEC algorithm. Edge relay device 104 may then transmit the decoded data packet to media server 106.

In another example, edge relay device 104 may receive, from media server 106, a third data packet associated with the second data flow (e.g., as indicated by an SSRC identifier included in the third data packet) that is to be forwarded to client device 102. Edge relay device 104 may cross reference the SSRC identifier included in the third data packet and determine that the second FEC algorithm is to be applied to the third data packet. Accordingly, edge relay device 104 may generate FEC data according to the second FEC algorithm (and parameters associated with the second FEC algorithm), and transmit the generated FEC data to client device 102 along with the third data packet.

Edge relay device 104 and client device 102 may continue to monitor and measure network conditions (e.g., latency and data packet loss) and report the measurements to media server 106 in a periodic manner. Based on these periodic reports, media server 106 may determine to alter or update the error correction procedures implemented on client device 102, edge relay device 104, and/or media server 106 in a dynamic manner. This continual updating of error correction procedures allows the components of network 100 to be coordinated in their error correction efforts, leading to more reliable real-time media communications in network 100.

FIG. 2 is an illustration of an example feedback message for a coordinated edge-assisted reliability mechanism for real-time media services, according to particular embodiments. Edge relay device 104 may insert data about packet losses measured at edge relay device 104 into feedback message 200 and transmit feedback message 200 to client device 102. Client device 102 may then extract the packet loss data from message 200 and process this data as described above with reference to FIG. 1. Message 200 may follow a common packet format for feedback messages such that message 200 comprises one or more fields according to a standardized format (e.g., as defined in the Internet Engineering Task Force (IETF) Network Working Group Request for Comment (RFC) 4585).

Message 200 may include version (V) field 202, which may indicate the communication protocol version used to communicate message 200. For example, version field 202 may have a value of 2, indicating that message 200 is communicated according to RTP version 2. Version field 202 may be 2 bits in length.

Message 200 may include padding (P) field 204. If set, padding field 204 may indicate that message 200 contains additional padding octets at the end of message 200 that are not part of control information but are included in the length field 210. Padding field 204 may be 1 bit in length.

Message 200 may include feedback message type (FMT) field 206. FMT field 206 may identify message 200's message type. In some cases, FMT field 206 may have a value of 2, which may indicate that message 200 is a first message type. For example, the first message type may correspond to a packet loss feedback message type, which indicates that message 200 includes information associated with packet losses as measured by an edge relay device. FMT field 206 may be 5 bits in length.

Message 200 may include payload type (PT) field 208. PT field 208 may indicate that message 200 is a RTP Control Protocol (RTCP) message. In some cases, PT field 208 may have a value of 205, which indicates that message 200 is a transport layer feedback message (RTPFB). In other cases, PT field 208 may have a value of 206, which indicates that message 200 is a payload-specific feedback message (PSFB). PT field 208 may be 8 bits in length.

Message 200 may include length field 210. Length field 210 may indicate the length of message 200 in 32-bit words minus one, including the header and any padding. Length field 210 may be 16 bits in length.

Message 200 may include a synchronization source (SSRC) of sender field 212, which may indicate the SSRC identifier of the device that sends message 200 (e.g., edge relay device 104). SSRC of sender field 212 may have a value of 0, which may indicate that the edge relay device is the sender of message 200. SSRC of sender field 212 may have a length of 32 bits.

Message 200 may include an SSRC of media source field 214, which may indicate the SSRC identifier of the media source to which message 200 is related. For example, SSRC of media source 214 may have a value that corresponds to the data packet flow for which the edge relay device measures packet loss. SSRC of media source field 214 may have a length of 32 bits.

Message 200 may include a packet loss data field 216. Packet loss data field 216 may include data associated with the packet losses measured by edge relay device 104. Data field 216 may have a variable length in bits.

FIG. 3 illustrates an example feedback message for a coordinated edge-assisted reliability mechanism for real-time media services, according to some embodiments. Client device 102 may insert data about latency on a first hop (i.e., between client device 102 and edge relay device 104), latency on second hop (i.e., between edge relay 104 and media server 106), and data packet loss rate into feedback message 300 as described above in more detail with reference to FIG. 1. Client device 102 may then transmit message 300 to media server 106, which may then extract the first hop latency, second hop latency, and data packet loss rate, and determine an error correction technique based on this information. Message 300 may follow a common packet format for feedback messages such that message 200 comprises one or more fields according to a standardized format (e.g., as defined in the IETF Network Working Group RFC 4585).

Message 300 may include version field 302, which may function as described with reference to version field 202 in FIG. 2 above. Message 300 may include padding field 304, which may function as described with reference to padding field 204 in FIG. 2 above. Message 300 may include FMT field 306, which may function as described with reference to FMT field 206 in FIG. 2 above. In some cases, FMT field 306 may have a value of 3, which may indicate that message 300 is a second message type. Message 300 may include PT field 308, which may function as described with reference to PT field 208 in FIG. 2 above. Message 300 may include length field 310, which may function as described with reference to length field 210 in FIG. 2 above.

Message 300 may include an SSRC of sender field 312, which may indicate the SSRC identifier of the device that sends message 300 (e.g., client device 102). SSRC of sender field 312 may have a length of 32 bits.

Message 300 may include an SSRC of media source field 314, which may indicate the SSRC identifier of the media source to which message 200 is related. For example, SSRC of media source 314 may have a value that corresponds to the data packet flow whose packet losses are reported in message 300. SSRC of media source 314 may have a length of 32 bits.

Message 300 may include first hop latency field 316, which may indicate the latency (e.g., in ms) experienced on the first hop as measured by client device 102 and described in more detail above with reference to FIG. 1. First hop latency field 316 may have a length of 12 bits.

Message 300 may include second hop latency field 318, which may indicate the latency (e.g., in ms) experienced on the second hop as measured by client device 102 and described in more detail above with reference to FIG. 1. Second hop latency field 318 may have a length of 12 bits.

Message 300 may include data packet loss rate field 320, which may indicate the percentage of data packets that are lost on the first hop, as determined by client device 102 and described in more detail above with reference to FIG. 1. Data packet loss rate field 320 may have a length of 8 bits.

FIG. 4 illustrates an example method for a coordinated edge-assisted reliability mechanism for real-time media services, according to some embodiments of the present disclosure. Method 400 begins at step 402. At step 404, client device 102 may measure latency experienced by messages transmitted between client device 102 and edge relay device 104 (i.e., on a first hop of a network) and may insert this first hop latency data in a first feedback message. Client device 102 may also measure latency experienced by messages transmitted between edge relay device 104 and media server 106 (i.e., on a second hop of the network) and may insert this second hop latency data in the first feedback message. Edge relay device 104 may measure packet losses that occur for transmissions sent to edge relay device 104, and may transmit this packet loss information in a second feedback message to client device 102. Client device 102 may measure packet losses that occur for communications between client device 102 and edge relay device 104 (i.e., on the first hop), and may determine what percentage of total packet losses occur on the first hop. Client device 102 may then insert this determined percentage, along with the first hop latency and second hop latency, into the first feedback message, which client device 102 may then send to media server 106.

At step 406, upon receiving the first feedback message, media server 106 may determine whether the total end-to-end latency (i.e., the sum of the first hop latency and second-hop latency) exceeds a latency threshold. If the end-to-end latency does not exceed the latency threshold, media server 106, at step 408, may determine to implement a retransmission procedure. Accordingly, media server 106 may transmit an instruction message to client device 102 and/or edge relay device 104 that configures client device 102 and/or edge relay device 104 to operate according to the retransmission procedure. When operating according to the retransmission procedure, client device 102 may send media server 106 (e.g., directly or using edge relay device 104), a message requesting the retransmission of lost or corrupted data packets. In response, media server 106 may retransmit the requested data packet(s). When implementing the first retransmission procedure, media server 106 may cease generating and transmitting FEC data.

If the end-to-end latency exceeds the latency threshold, media server 106, at step 410, may determine whether the first hop latency is lower than the second hop latency. If the first hop latency is less than the second hop latency, media server 106, at step 412, may select a first error correction procedure. If the first hop latency is greater than the second hop latency, media server 106, at step 414, may select a second error correction procedure. Accordingly, media server 106 may transmit an instruction message to client device 102 and/or edge relay device 104 that configures client device 102 and/or edge relay device 104 to operate according to the first or second error correction procedure that media server 106 selected. For example, the instruction message may identify a client device (e.g., client device 102) and one or more data flows associated with the client device. In some cases, edge relay device 104 may implement the selected first or second error correction procedure for communications associated with the identified client device and identified one or more data flows.

At step 416, edge relay device 104 may implement the first or second error correction procedure that was selected by media server 106. When implementing the first error correction procedure, edge relay device 104 may operate as a cache for data packets sent to client device 102. Whenever client device 102 sends to edge relay device 104 a message requesting the retransmission of lost or corrupted data packets, edge relay device 104 may retransmit the requested data packet(s) in accordance with the first error correction procedure. In some cases, media server 106 may determine to cease generating and sending FEC data when edge relay device 104 operates according to the first error correction procedure. Media server 106 may make this determination based at least in part on packet loss measurements received from client 102.

When implementing the second error correction procedure, edge relay device 104 may implement an FEC algorithm to generate and/or decode FEC data. In some cases, media server 106 may send one or more messages that include the FEC algorithm, or other information indicating the FEC algorithm, that edge relay device 104 is to use (as well as any associated FEC parameters). Edge relay device 104 may implement the FEC algorithm by generating FEC data based on the FEC algorithm and transmit the generated FEC data to client device 102 along with real-time media data packets. Edge relay device 104 may implement the FEC algorithm to supplement data flows associated with a particular client device only and not others.

Various embodiments may perform some, all, or none of the steps described above. Furthermore, certain embodiments may perform these steps in a different order or in parallel. While discussed as client device 102, edge relay device 104, and media server 106, as performing the steps of this method, any suitable component of network 100 may perform one or more steps of the method.

FIG. 5 illustrates an example of a computer system, in accordance with certain embodiments. In particular embodiments, one or more computer systems 500 provide functionality described or illustrated herein. As an example, one or more computer systems 500 may be used to provide at least a portion of client device 102, edge relay device 104, and media server 106 described with respect to FIG. 1. As yet another example, one or more computer systems 500 may be used to perform one or more steps described with respect to FIG. 4. In particular embodiments, software running on one or more computer systems 500 provides functionality described or illustrated herein or performs one or more steps of one or more methods described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache.

Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method, comprising:
    transmitting, by a media server, data packets to an edge relay device for forwarding to a client device;
    receiving, from the client device, which has measured an end-to-end latency, a first-hop latency, and a second-hop latency, a feedback message indicating the end-to-end latency, the first-hop latency, and the second-hop latency, wherein the end-to-end latency is associated with communications between the edge relay device, the media server, and the client device, the first-hop latency is associated with communications between the edge relay device and the client device, and the second-hop latency is associated with communications between the edge relay device and the media server;
    determining, by the media server, that the end-to-end latency is greater than a latency threshold;
    determining, by the media server, that the first-hop latency is greater than the second-hop latency;
    determining, by the media server, an error correction procedure based at least in part on the end-to-end latency being greater than the latency threshold and the first-hop latency being greater than the second-hop latency; and
    transmitting, by the media server, one or more messages indicating the error correction procedure to the edge relay device.

2. The method of claim 1, wherein the message identifies the client device and data flows associated with the client device for which the error correction procedure should be implemented.

3. The method of claim 1, wherein implementing the error correction procedure further comprises:
    storing, at the edge relay device, data packets sent from the media server; and
    transmitting one or more of the stored data packets to the client device upon receiving a retransmission request from the client device.

4. The method of claim 1, wherein implementing the error correction procedure further comprises:
    generating, by the edge relay device, forward error correction (FEC) data; and
    adding the FEC data to data packets received at the edge relay device.

5. The method of claim 4, wherein the FEC data is generated based at least in part on an FEC algorithm communicated by the media server.

6. A system, comprising:
    one or more processors; and one or more computer-readable non-transitory storage media comprising instructions that, when executed by the one or more processors, cause one or more components of the system to perform operations comprising:

transmitting, by a media server, data packets to an edge relay device for forwarding to a client device;

receiving, from the client device, which has measured an end-to-end latency, a first-hop latency, and a second-hop latency, a feedback message indicating the end-to-end latency, the first-hop latency, and the second-hop latency, wherein the end-to-end latency is associated with communications between the edge relay device, the media server, and the client device, the first-hop latency is associated with communications between the edge relay device and the client device, and the second-hop latency is associated with communications between the edge relay device and the media server;

determining, by the media server, that the end-to-end latency is greater than a latency threshold;

determining, by the media server, that the first-hop latency is greater than the second-hop latency;

determining, by the media server, an error correction procedure based at least in part on the end-to-end latency being greater than the latency threshold and the first-hop latency being greater than the second-hop latency; and transmitting, by the media server, a message indicating the error correction procedure to the edge relay device.

7. The system of claim 6, wherein the message identifies the client device and data flows associated with the client device for which the error correction procedure should be implemented.

8. The system of claim 6, wherein implementing the error correction procedure further comprises:

storing, at the edge relay device, data packets sent from the media server; and transmitting one or more of the stored data packets to the client device upon receiving a retransmission request from the client device.

9. The system of claim 6, wherein implementing the error correction procedure further comprises:

generating, by the edge relay device, forward error correction (FEC) data; and adding the FEC data to data packets received at the edge relay device.

10. The system of claim 9, wherein the FEC data is generated based at least in part on an FEC algorithm communicated by the media server.

11. One or more computer-readable non-transitory storage media embodying instructions that, when executed by a processor, cause performance of operations comprising:

transmitting, by a media server, data packets to an edge relay device for forwarding to a client device;

receiving, from the client device, which has measured an end-to-end latency, a first-hop latency, and a second-hop latency, a feedback message indicating the end-to-end latency, the first-hop latency, and the second-hop latency, wherein the end-to-end latency is associated with communications between the edge relay device, the media server, and the client device, the first-hop latency is associated with communications between the edge relay device and the client device, and the second-hop latency is associated with communications between the edge relay device and the media server;

determining, by the media server, that the end-to-end latency is greater than a latency threshold;

determining, by the media server, that the first-hop latency is greater than the second-hop latency;

determining, by the media server, an error correction procedure based at least in part on the end-to-end latency being greater than the latency threshold and the first-hop latency being greater than the second-hop latency; and transmitting, by the media server, a message indicating the error correction procedure to the edge relay device.

12. The one or more computer-readable non-transitory storage media of claim 11, wherein the message identifies the client device and data flows associated with the client device for which the error correction procedure should be implemented.

13. The one or more computer-readable non-transitory storage media of claim 11, wherein implementing the error correction procedure further comprises:

storing, at the edge relay device, data packets sent from the media server; and transmitting one or more of the stored data packets to the client device upon receiving a retransmission request from the client device.

14. The one or more computer-readable non-transitory storage media of claim 11, wherein implementing the error correction procedure further comprises:

generating, by the edge relay device, forward error correction (FEC) data; and adding the FEC data to data packets received at the edge relay device.

15. The one or more computer-readable non-transitory storage media of claim 14, wherein the FEC data is generated based at least in part on an FEC algorithm communicated by the media server.

* * * * *